UNITED STATES PATENT OFFICE.

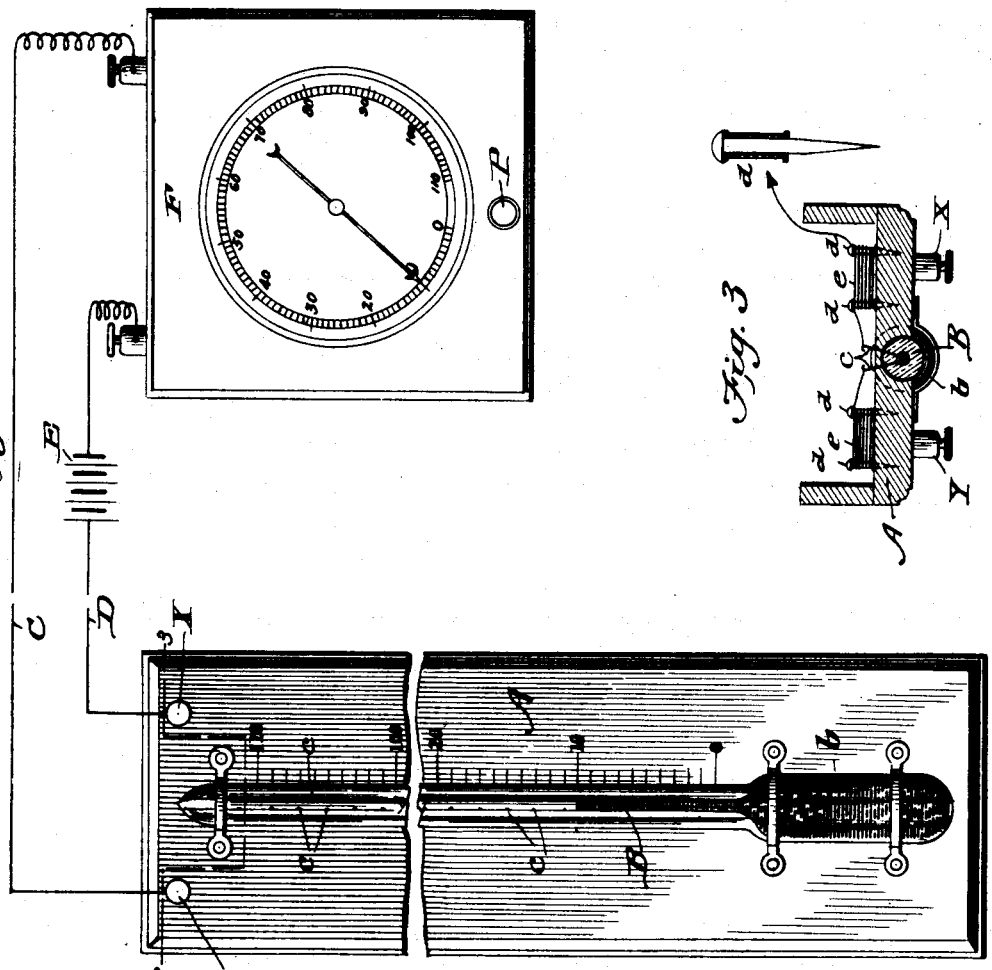

FRANK LEE JOBSON, OF RICHMOND, VIRGINIA.

ELECTRIC TEMPERATURE-INDICATOR.

SPECIFICATION forming part of Letters Patent No. 682,084, dated September 3, 1901.

Application filed August 15, 1900. Serial No. 26,963. (No model.)

*To all whom it may concern:*

Be it known that I, FRANK LEE JOBSON, of Richmond, in the county of Henrico and State of Virginia, have invented a new and useful Improvement in Electric Temperature-Indicators, of which the following is a specification.

The object of my invention is to enable persons stationed in rooms or locations remote or apart from rooms or locations in which a thermometer is placed to read the state of said thermometer from a distance without having to visit or inspect the thermometer itself.

It is specially designed for the use of engineers and others who have charge of the regulation of temperature in cold-storage rooms, on board ships, or elsewhere and for regulating temperature in hospitals, nurseries, hothouses, school-buildings, hotels, and other public and private buildings from a central point and without having to visit the various rooms in order to ascertain the temperature thereof.

My invention consists in the special construction and arrangement of a thermometer-tube with terminal contacts fused in the same in exposed relation to the mercury column, a special form of graduated resistances connected with said terminals, and a special form of case for inclosing the same, the whole being adapted for use in combination with a current meter or indicator for indicating the height of the mercury column, as hereinafter described.

Figure 1 is a side view of the entire apparatus. Fig. 2 is a rear view of the thermometer, and Fig. 3 a cross-section through the same on line 3 3 of Fig. 1.

In the drawings, A represents a thermometer-frame, and B its glass mercury-tube, having at its lower end a bulb $b$. Along the tube B at regular intervals are arranged little platinum-wire contact-points $c$, one opposite each graduation of the thermometer. These contacts are fused or otherwise fixed in the glass tube, so that their inner ends will be flush with and in direct contact with the mercury column as it rises and falls. Each one of these wires is a terminal of a rheostat-coil, of which there are two series arranged vertically on opposite sides of the mercury-tube, each coil being composed of a suitable number of turns of insulated wire $e$ around two pins $d\ d$, fixed in the back of the frame, as seen in Fig. 3. The shanks of these pins where the coils contact with them are covered by insulating-sleeves, and the wire of one coil extends to the next one above and below it in the usual manner of rheostats. The coils are arranged in two series for convenience in location to get close readings, and the wires $c'\ c'$ of both series at the top connect with the same binding-post X. From another binding-post Y besides the first a wire $a$ leads to the mercury-bulb $b$ and is sealed in the same or in its neck, so as to be in permanent contact with the mercury therein. To the two binding-posts X and Y are connected the two circuit-wires C and D, that lead from the thermometer to any remote point where the readings are to be observed and at which point is located the indicator F, whose graduations are designed to correspond exactly with those of the thermometer and the deflection of whose index-hand over the circular graduations indicates the elevation of the mercury column in the thermometer, and consequently the temperature. The indicator F may be constructed on the plan of any good volt-meter, ammeter, or any instrument for measuring current, and which being well known and forming no special feature of novelty need not be further described. Now current being established on the circuit-wires C and D through a battery E it will be seen that when the mercury column rises or falls in the tube B it cuts in or out an exactly-regulated amount of resistance in the shape of the coils $e$, and by a corresponding current measurement in the indicator F denotes the height of the mercury column and the temperature of the room in which it is located. The normal condition of the circuit is open, and it is arranged to be closed at will to indicate the temperature by means of any suitable switch or push-button, (shown at P.)

I am aware that electric temperature-indicators are not broadly new, and therefore claim only my novel construction and arrangement of apparatus for this purpose.

The chief distinguishing features of my invention are the particular form and relation of the resistances to the mercury-tube and the containing-case, the resistances being composed of wire wound in the form of bobbins arranged transversely to the mercury-tube upon pins projecting from the rear of the face-plate A of the case and arranged in two vertical series upon opposite sides of the tube, said face-plate having rearwardly-projecting side strips or flanges for inclosing and housing between them the resistances and their connection, thus protecting them and adapting them to be inclosed by a back board or filling of cement, if desired.

Having thus described my invention, what I claim as new, and desire to secure by Letters Patent, is—

1. In an electric temperature-indicator, the combination of a face-plate having along its side edges two rearwardly-projecting strips or flanges, a glass mercury-tube arranged in the face-plate and having terminal wire contacts fused therein along the line of the mercury column and in exposed relation thereto, two series of resistances connected to said terminal contacts, said resistances being composed of transverse wire bobbins wound upon pairs of pins projecting rearwardly from the face-plate, said resistances and their connections being housed and protected within the inclosure of the side strips or flanges substantially as and for the purpose described.

2. An electric temperature-indicator, consisting of a face-plate having along its side edges two rearwardly-projecting strips or flanges, a glass mercury-tube arranged in the face-plate and having terminal wire contacts fused therein along the line of the mercury column and in exposed relation thereto, two series of resistances connected to said terminal contacts, said resistances being composed of transverse wire bobbins wound upon pairs of pins projecting rearwardly from the face-plate within the inclosure of the side strips or flanges of the frame, a binding-post connected to the mercury-bulb, and another binding-post connected to the two series of resistances, and a battery, current-indicator, and electric circuit connecting the same to the binding-posts substantially as and for the purpose described.

FRANK LEE JOBSON.

Witnesses:
RUSSELL BARGAMIN,
E. C. FOLKES.